United States Patent [19]

Seeley et al.

[11] Patent Number: 5,096,153

[45] Date of Patent: Mar. 17, 1992

[54] SHOCK AND VIBRATION MOUNT

[75] Inventors: Dale F. Seeley, Champlin; Michael D. Olson, Anoka; Gary A. Salmonson, St. Cloud, all of Minn.

[73] Assignee: Onan Corporation, Minneapolis, Minn.

[21] Appl. No.: 601,255

[22] Filed: Oct. 19, 1990

[51] Int. Cl.⁵ .............................................. F16M 5/00
[52] U.S. Cl. ................................ 248/635; 267/140.3; 267/141.1
[58] Field of Search .............. 248/634, 632, 635, 638, 248/611; 403/224, 227; 267/153, 293, 294, 140.3, 141.1, 141.2, 141.3, 141.4, 141.5, 140.4

[56] References Cited

U.S. PATENT DOCUMENTS

| | | | |
|---|---|---|---|
| 1,731,837 | 10/1929 | Wood | 248/635 |
| 1,897,014 | 2/1933 | Trott | |
| 2,196,428 | 4/1940 | Saurer | 267/140.4 |
| 2,514,811 | 7/1950 | Stephenson | 267/140.3 |
| 2,538,658 | 1/1951 | Saurer | 267/141.5 |
| 2,766,163 | 10/1956 | Schwartz et al. | |
| 3,193,237 | 7/1965 | Adams | 267/141.4 |
| 3,323,764 | 6/1967 | Johnson | 267/140.4 |
| 3,770,235 | 11/1973 | Klapproth | 248/634 |
| 3,947,007 | 3/1976 | Pelat | |
| 4,711,423 | 12/1987 | Popper | |
| 4,783,039 | 11/1988 | Peterson | 248/648 |
| 4,826,142 | 5/1989 | Heynemann et al. | |
| 4,858,880 | 8/1989 | Durand | 248/635 |

FOREIGN PATENT DOCUMENTS

| | | | |
|---|---|---|---|
| 3621595 | 1/1988 | Fed. Rep. of Germany | 248/674 |
| 45124 | 3/1986 | Japan | 267/153 |
| 616689 | 1/1949 | United Kingdom | 248/635 |

OTHER PUBLICATIONS

Barry Mount W Series Ring and Bushing Mounts brochure, pp. 19 and 20.
Karman Rubber Torsional Control Vibro-Insulator brochure, pp. 11-15.

Primary Examiner—David M. Purol
Assistant Examiner—Robert A. Olson
Attorney, Agent, or Firm—Merchant, Gould, Smith, Edell, Welter & Schmidt

[57] ABSTRACT

A shock and vibration mount including a mounting bolt, a first elastomer member, a support bracket, and a second elastomer member. The first elastomer member is interposed between the bottom surface of a mechanism which vibrates and the top surface of the support bracket. The second elastomer member is interposed between the under-surface of the mounting bolt head and the bottom surface of the support bracket. The first and second elastomer members and the support bracket do not normally contact the mounting bolt shaft.

14 Claims, 4 Drawing Sheets

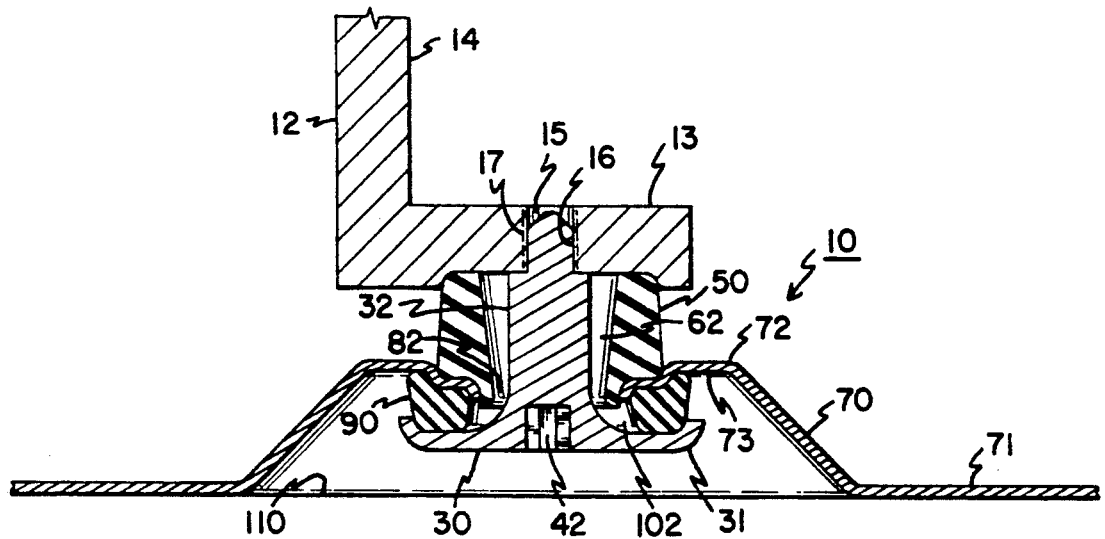
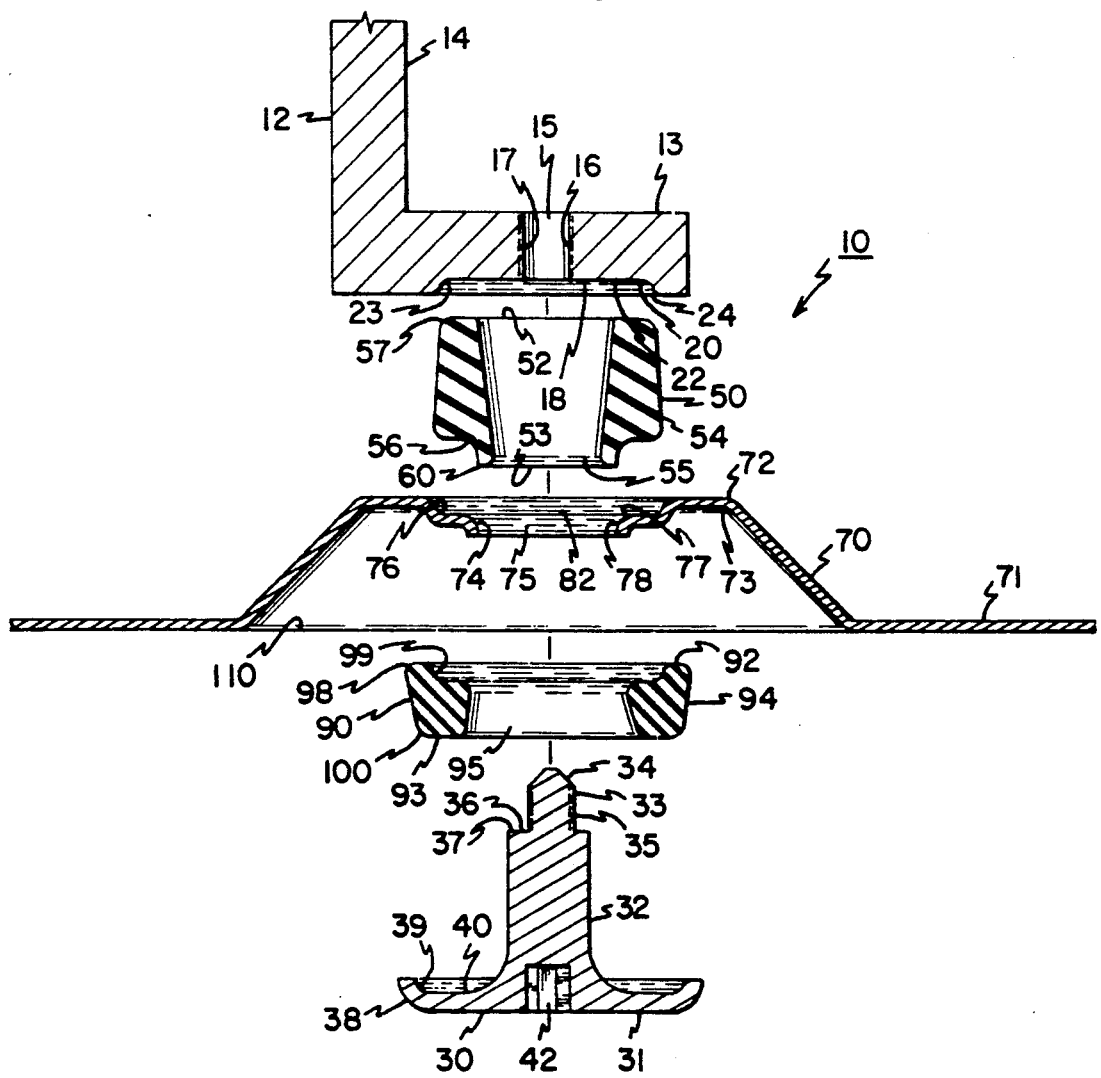

5,096,153

SHOCK AND VIBRATION MOUNT

FIELD OF THE INVENTION

The present invention relates to mounting devices and, more particularly, to mounting devices which use elastomeric members to attach to a foundation a mechanism which vibrates.

BACKGROUND OF THE INVENTION

Numerous mechanisms exist which produce vibrations during use, such as electrical generators and engines. It is often desirable to mount such a mechanisms to a non-vibrating foundation. The primary function of a shock and vibration mount is to protect the non-vibrating foundation against damage from the shock and vibration forces produced by the mechanism which vibrates.

Rubber bumpers are often placed on the bottom of mechanisms which vibrate to protect the foundation. Rubber bumpers rely on the weight of the mechanism which vibrates to retain contact with the foundation. More secure mounting means are often desired for mechanisms which produce larger shock and vibration forces.

Mounting devices are presently available which bolt the mechanism which vibrates to the foundation and interpose elastomers between the mechanism which vibrates and the foundation. Sometimes, the elastomers are bonded to one or more pieces of metal. In those cases, the metal pieces are attached to the mechanism and to the foundation.

On example of a mounting device is U.S. Pat. No. 2,196,428, which describes a mounting device which uses resilient members (27, 38). Another example is U.S. Pat. No. 3,323,764 which describes a mounting device (15) which uses resilient cushion members (24,25).

Previous devices such as those mentioned above do not adequately dampen horizontal vibratory forces, are difficult to assemble and to manufacture, comprise numerous parts, and allow metal-to-metal contact. Accordingly, a need exists for an easily assembled and manufactured, cost effective mounting device which can substantially absorb both vertical and horizontal vibratory forces while securely mounting to a foundation the mechanism which vibrates.

SUMMARY OF THE INVENTION

The present invention is designed to absorb vibrator forces from a mechanism which vibrates in both a vertical and a horizontal direction. The mechanism which vibrates can be an electric generator, engine or other mechanism which produces undesirable vibrations in performing its desired function.

The present invention includes (i) a mounting bolt, (ii) a first elastomer member, (iii) a support bracket and (iv) a second elastomer member. The first elastomer member is interposed between the bottom surface of the mechanism which vibrates and the top surface of the support bracket, and the second elastomer member is interposed between the under-surface of the mounting bolt head and the bottom surface of the support bracket. The first and second elastomer members and the support bracket do not normally contact the mounting bolt shaft. When configured in this way, the elastomer members absorb vertical shock and vibratory forces in compression and absorb horizontal shock and vibratory forces in sheer.

Other features which are considered characteristic of various embodiments of the invention are set forth in the detailed description and claims.

Although several embodiments of the invention are illustrated and described herein, the invention is nevertheless not intended to be limited to the details shown, since various modifications in structure may be made therein without departing from the spirit of the invention and within the scope and range of equivalents of the claims.

The construction and method of operation of the invention, however, together with additional objects and advantages thereof, would be best understood from the following description of specific embodiments when read in connection with the accompanying drawings.

BRIEF DESCRIPTION OF THE DRAWINGS

In the figures wherein like reference numerals indicate generally corresponding parts throughout the several views:

FIG. 1 is a cross-sectional side view of an embodiment in accordance with the principles of the invention.

FIG. 3 is a cross-sectional exploded view of the embodiment depicted in FIG. 1.

DETAILED DESCRIPTION OF THE INVENTION

Figure 2:
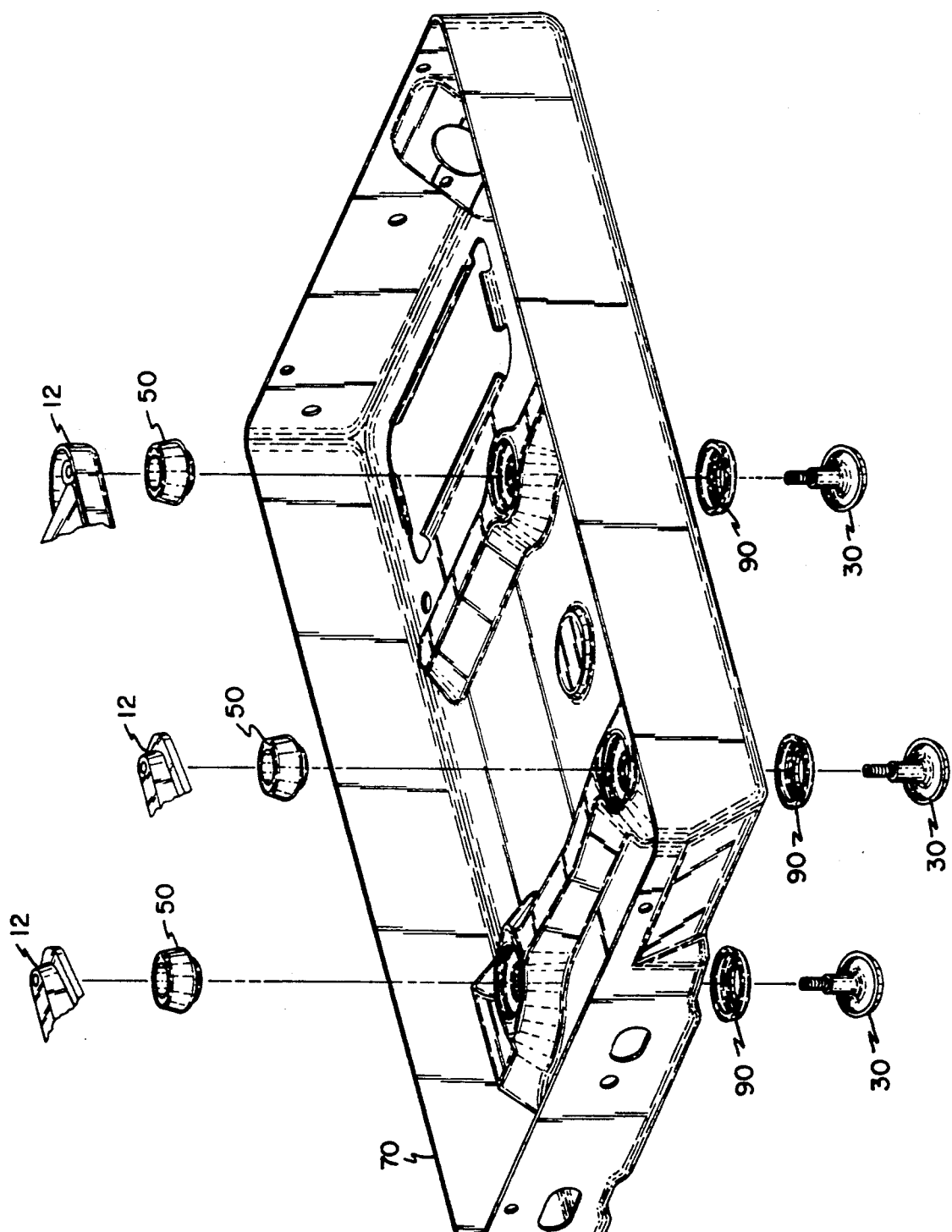
FIG. 2 is a perspective exploded view of the embodiment depicted in FIG. 1 with a detailed example of a support bracket.

An embodiment of a mount in accordance with the principles of the present invention is shown in FIGS. 1-4, the mount being generally referred to by the reference numeral 10. The mount 10 is shown as having four components: (i) a mounting bolt 30, (ii) a first elastomer member 50, (iii) a support bracket 70, and (iv) a second elastomer member 90. The mount 10 attaches a mechanism 12 which vibrates to a foundation 110. The mechanism 12 can be any mechanism which produces vibrations during use, such as a generator or an engine. The foundation 110 can be any suitable structure to which attachment of the mechanism 12 is desired.

Referring now in more detail to FIGS. 1-4, the mechanism 12 has a foot portion 13 and a wall portion 14. The foot portion 13 has a bolt hole 15 for insertion of the mounting bolt 30 therethrough. The bolt hole 15 has a bolt hole wall 16 which may be finished with threads 17. The foot portion 13 has a bottom surface 18 with a bottom circular edge 18 around the bolt hole 15. The bottom surface 20 may include an indentation 22. The indentation 22 has a surface 23 and a rim 24. This indentation 22 provides a captive surface for restraining movement of a top surface 52 of the first elastomer member 50.

The mounting bolt 30 has a head 31, a shaft 32 and an end portion 33. The end portion 33 is rigidly attached to the mechanism 12. The end portion 33 may be finished with threads 35 to provide rigid attachment to the mechanism 12. The end portion 33 may include a guide tip 34 to aid in inserting the mounting bolt 30 into the bolt hole 15. The mounting bolt shaft 32 has an abutment 36 with an abutment surface 37. When the mounting bolt 30 is fully screwed into the bolt hole 15, the abutment surface 37 contacts the bottom circular edge 18 to prevent further insertion of the mounting bolt 30. The abutment 36 is positioned at a predetermined location along the shaft 32 to properly compress the first and second elastomer members 50 and 90. The mounting bolt head 31 has a flange 38 and an under-surface 40. Optionally, a brim 39 may be provided. As shown, the head 31 has an allen head orifice 42 for insertion of an allen head wrench (not shown) to rotate the mounting bolt 30. It is to be appreciated that the allen head orifice 42 could have a variety of shapes for use with any of a variety of internal drive mechanisms such as a screw driver or a torx mechanism.

The first elastomer member 50 has a top surface 52 and a bottom surface 53 opposite the top surface 52. The first elastomer member 50 also has an aperture side surface 54 which defines an aperture 55 for insertion of the mounting bolt 30 therethrough. The aperture 55 is larger than the mounting bolt shaft 32, and a clearance gap 62 exists between the first elastomer member 50 and the mounting bolt 30. As shown, the first elastomer member 50 is annular in shape and the aperture 55 is circular. The top surface 52 of the first elastomer member 50 contacts the bottom surface 20 of the mechanism 12 at the indentation surface 23. The first elastomer member 50 has an upper outside corner 57 which contacts the indentation rim 24. The upper outside corner 57 fits snugly against the indentation rim 24 to captivate, or restrain, the top surface 52 of the first elastomer member 50 from movement relative to the indentation surface 23. The first elastomer member 50 has a lip 56 and a lower outside corner 60.

The support bracket 70 has an exterior base portion 71. The exterior base portion 71 is rigidly attached to the foundation 110 in any suitable fashion. The support bracket 70 has a top surface 72 and a bottom surface 73. The support bracket 70 has an inside edge 74 which defines an aperture 75 for insertion of the mounting bolt 30 therethrough. The aperture 75 is larger than the mounting bolt shaft 32, and a clearance gap 82 exists between the first elastomer member 50 and the mounting bolt 30. The top surface 72 of the support bracket 70 contacts the bottom surface 53 of the first elastomer member 50. As shown, the support bracket 70 has outside, middle and inside bends 76, 77, and 78. The lower outside corner 60 and lip 56 of the first elastomer member 50 fit snugly against the middle and inside bends 77 and 78. The shape of the support bracket 70 captivates the bottom surface 53 of the first elastomer member 50 to restrain movement of the bottom surface 53 relative to the support bracket 70. The support bracket 70 may be made of any sufficiently strong material, such as steel.

The second elastomer member 90 has a top surface 92 and a bottom surface 93. The second elastomer member 90 has an aperture side surface 94 which defines an aperture 95 for insertion of the mounting bolt 30 therethrough. The aperture 95 is larger than the mounting bolt shaft 32, and a clearance gap 102 exists between the second elastomer member 90 and the mounting bolt 30. As shown, the second elastomer member 90 is annular in shape and the aperture 95 is circular. The top surface 92 of the second elastomer member 90 contacts the bottom surface 73 of the support bracket 70. The second elastomer member 90 has an outside ridge 98 and an upper inside corner 99. The outside ridge 98 fits snugly against the outside bend 76 of the support bracket 70, and the upper inside corner 99 fits snugly against the inside bend 78 of the support bracket 70. The shape of the support bracket 70 captivates the top surface 92 of the second elastomer member 90 to restrain movement of the top surface 92 relative to the support bracket 70. The bottom surface 93 of the second elastomer member 90 contacts the under-surface 40 of the mounting bolt 30. Friction between the bottom surface 93 and the under-surface 40 helps to restrain movement between the bottom surface 93 and the under-surface 40. If a mounting bolt brim 39 is provided, a lower outside corner 100 of the second elastomer 90 fits snugly against the mounting bolt brim 39 to further help restrain movement. The elastomer members 50, 90 are made of any suitable shape-retaining elastic material, such as rubber. The elastomer members should have a natural frequency which is less than the disturbing frequency of the mechanism 12 for substantial absorption of vibrational energy.

Figure 4:
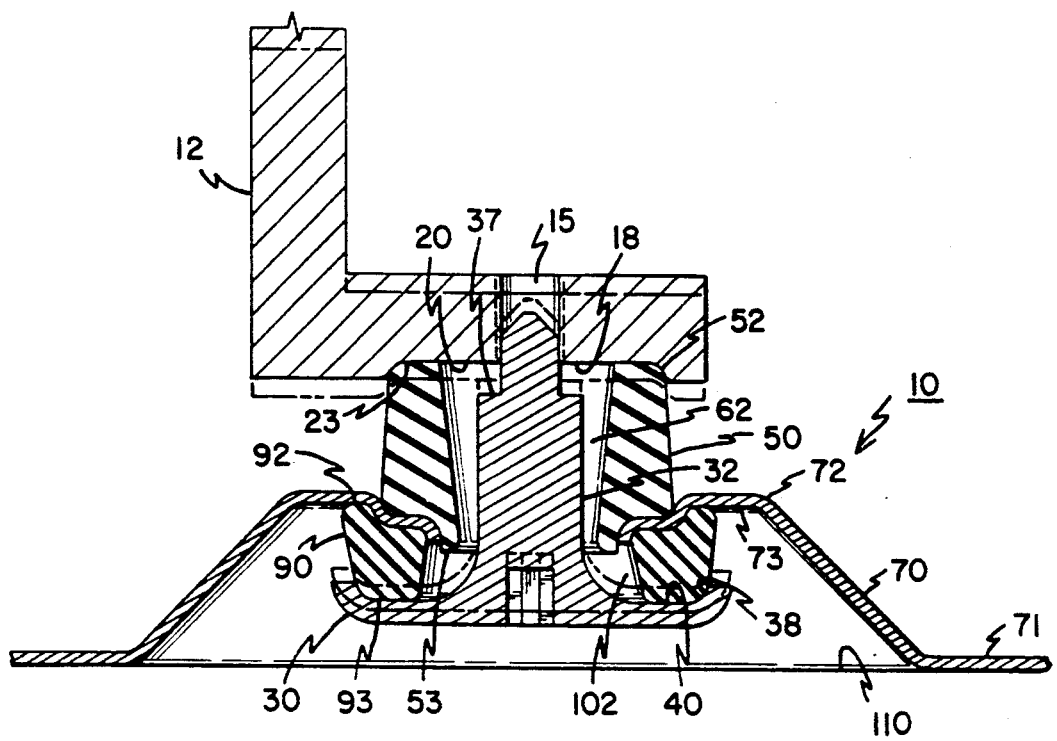
FIG. 4 is a cross-sectional side view of the embodiment depicted in FIG. 1 showing the compression of the elastomers bearing tensioning of the mounting bolt.

Referring to FIGS. 3 and 4, the assembly of the mount 10 is shown. The first elastomer member 50 is placed on the support bracket 70 such that the bottom surface 53 of the first elastomer member 50 is placed against the support bracket 70. The middle and inside bends 77 and 78 of the support bracket 70 fit snugly around the lower outside corner 60 and lip 56 of the first elastomer member 50, helping to axially center the support bracket 70 and hold the support bracket 70 in place during assembly. The bottom surface 18 of the mechanism 12 is placed against the first elastomer member 50. The upper outside corner 57 of the first elastomer member 50 fits snugly into the indentation rim 24, helping to axially center the first elastomer member 50 and hold the first elastomer member 50 in place during assembly.

Next, the second elastomer member 90 is placed against the bottom surface 73 of the support bracket 70. The outside ridge 98 and the upper inside corner 99 of the second elastomer member 90 fit snugly against the outside and inside bends 76 and 78 of the support bracket 70, helping to axially center the second elastomer member 90 and hold the second elastomer member 90 in place during assembly.

The mounting bolt 30 is axially inserted through the apertures 94, 74 and 54 in the second elastomer member 90, the support bracket 70 and the first elastomer member 50, respectively. The guide tip 34 on the end portion 33 of the mounting bolt 30 helps to axially center the mounting bolt 30 in the bolt hole 15 and aids in starting the interconnection of the mounting bolt threads 35 with the bolt hole threads 17. An allen wrench (not shown) is placed into the allen wrench orifice 42 for rotating the mounting bolt 30. The mounting bolt 30 is screwed into the bolt hole 15 until the abutment surface 37 contacts the bottom circular edge 20.

The final step in assembling the mount 10 is to rigidly connect the base portion 71 of the support bracket 70 to the foundation 110, not shown.

FIG. 4 shows the mounting bolt 30 partially screwed into the bolt hole 15. The flange 38 of the mounting bolt 30 contacts the bottom surface 93 of the second elastomer member 90 before the abutment surface 37 contacts the bottom circular edge 20. Full insertion of the mounting bolt 30 vertically compresses the elastomer members 50, 90. The abutment surface 37 is positioned along the shaft 32 to set the desired static vertical compression of the elastomer members 50, 90. The static vertical compression of the elastomer members 50, 90 allows the top and bottom surfaces 52, 53, 92, and 93 to retain contact with their respective adjacent surfaces 18, 72, 73, and 40 during vibration.

Displacement of the mechanism 12 can happen due to vibration forces or due to shock forces. The forces can occur in vertical or horizontal directions. One object of the mount 10 is to safely and quietly absorb the shock or vibration forces and return the mechanism which vibrates to its static position.

When the mechanism 12 displaces downward, the first elastomer member 50 is vertically compressed past its static vertically compressed position. The lower elastomer member 90 correspondingly expands to retain contact with the mounting bolt flange 38. The compression and expansion of the elastomer members 50, 90 absorbs vibrational energy and exerts pressure to return the mechanism 12 to its static position. The pressure exerted upward against the mechanism 12 increases with increased downward dislocation. When the mechanism 12 dislocates upward, the roles of the elastomer members 50, 90 are reversed with the same result.

When the mechanism 12 displaces horizontally, the top surface 52 of the first elastomer member 50 correspondingly moves horizontally. The bottom surface 53 of the first elastomer member 50 retains contact with the support bracket 70 and remains stationary. The relative movement of the top surface 52 to the bottom surface 53 puts the first elastomer member 50 into sheer, absorbing vibrational energy and increasingly forcing the mechanism 12 to its static horizontal position. The second elastomer member 90 correspondingly engages in sheer deformation between the mounting bolt undersurface 38 and the support bracket bottom surface 73. The mating contours of the top and bottom surfaces 52, 53, 92, 93 of the first and second elastomer members 50, 90 and their respective adjacent surfaces 23, 72, 73, 40 helps the elastomer surfaces to retain contact during horizontal dislocation.

The clearance gaps 62, 82, 102 allow substantial displacement of the mounting bolt 30 before the mounting bolt shaft 32 contacts the lip 56 of the first elastomer member 50. The lip 56 of the first elastomer member 50 prevents metal-to-metal contact between the mounting bolt shaft 32 and the support bracket inside edge 74 even upon extreme horizontal dislocation.

The mounting bolt head 31 is larger than the support bracket aperture 74, and the mounting bolt 30 cannot be pulled all the way through the support bracket 70. This fail-safe feature keeps the mechanism 12 from being separated from the foundation 110 in the event of a violent collision, such as an automobile crash. As noted above, the bolt hole 15 through mechanism 12 threadedly engages mounting bolt 30. Should either or both elastomer members 50, 90 fail, the bolt 30 is still retained by bracket 70 to restrain the mechanism 12 from movement away from bracket 70.

Figure 5:
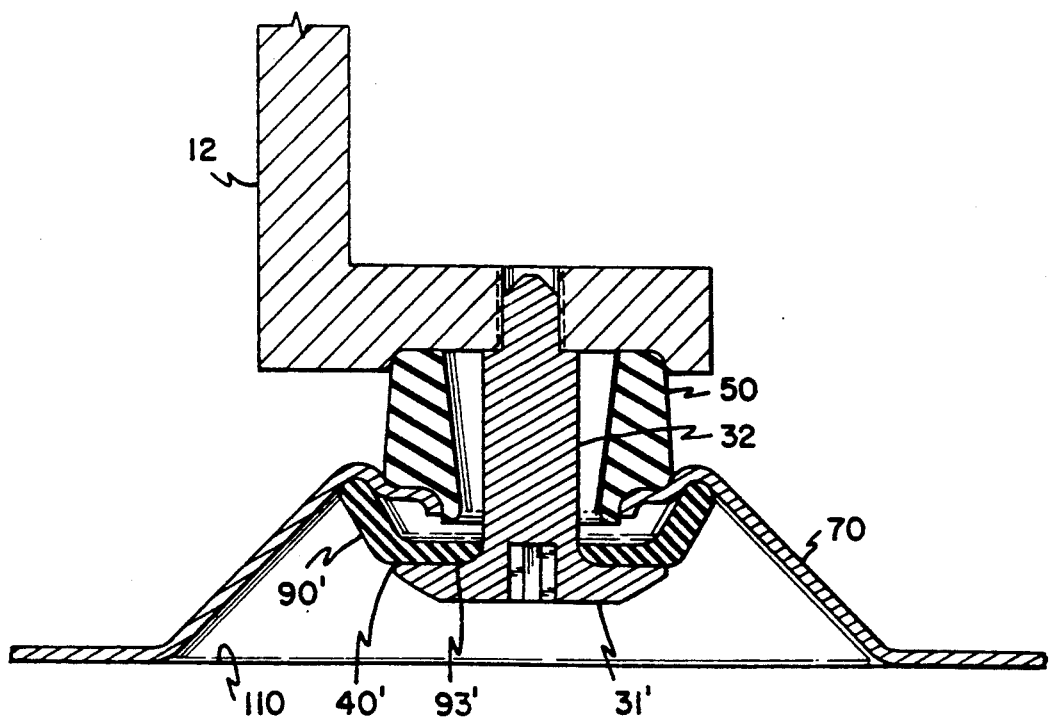
FIG. 5 is a cross-sectional side view of a first alternate embodiment of the invention.

Referring to the alternate embodiment depicted in FIG. 5, the second elastomer member 90' undergoes sheer deformation during vertical dislocation of the mechanism 12 and undergoes compression and expansion during horizontal dislocation of the mechanism which vibrates 12. The mounting bolt head 31' does not have a brim, but the under-surface 40' engages the bottom surface 93' of the second elastomer member 90' to some extent through frictional contact.

Figure 6:
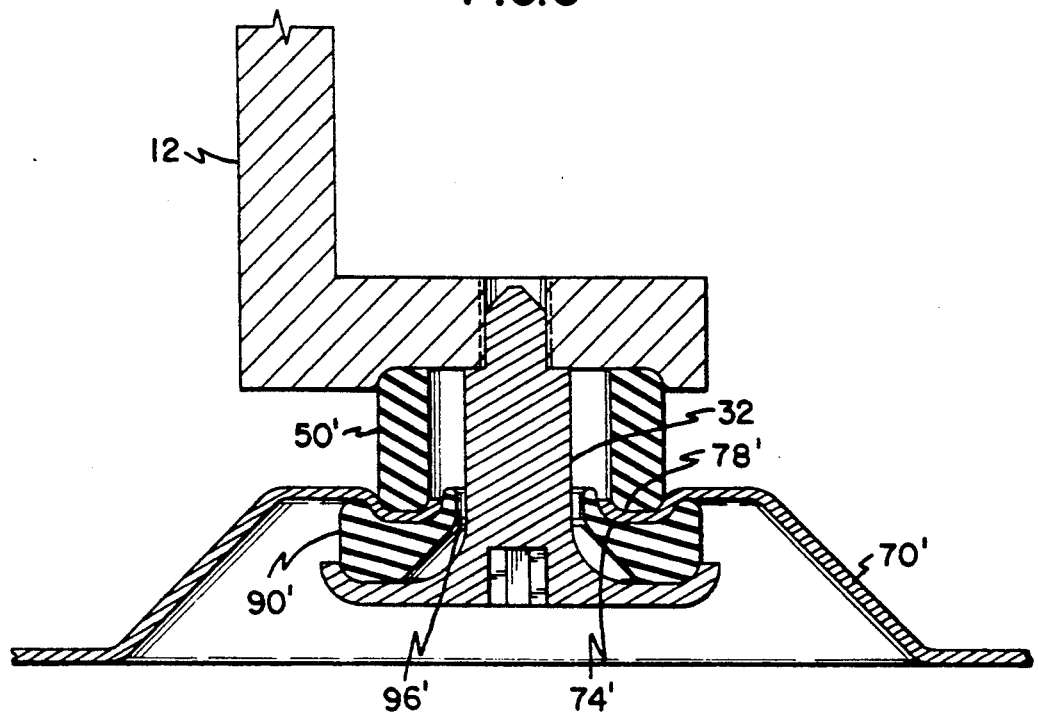
FIG. 6 is a cross-sectional side view of a second alternate embodiment of the invention.

Referring to the alternate embodiment depicted in FIG. 6, the second elastomer member 90' has a lip 96' between the support bracket inside edge 74' mounting bolt shaft 32'. The inside bend 78' is in the upward direction, and the elastomer members 50', 90' have corresponding cross sectional contours to mate to the support bracket 70' and the second.

Figure 7:
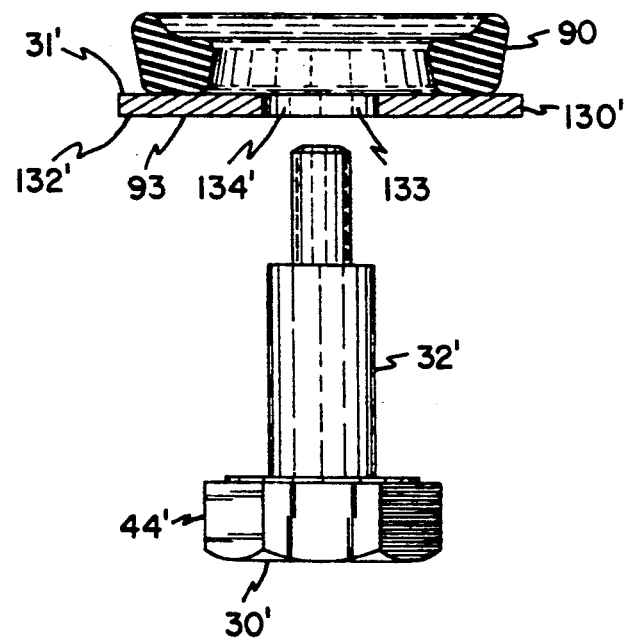
FIG. 7 is a cross-sectional side view of a third alternate embodiment of the invention.

Referring to the alternate embodiment depicted in FIG. 7, the mounting bolt 30' is shown with a hexagonal head 44'. A washer 130' is placed between the mounting bolt head 44' and the second elastomer member 90. The washer top surface 31' contacts the bottom surface 93 of the second elastomer member 90, and the washer bottom surface 132' contacts the under-surface 40' of the mounting bolt head 42'. The washer 130' has an aperture 133' for axial insertion of the mounting bolt 30' therethrough. The washer 130' has an aperture side surface 134' which contacts the mounting bolt shaft 32' to prevent horizontal dislocation between the washer 130' and the mounting bolt 30'.

Having read the foregoing description, it is to be understood, that even though numerous characteristics and advantages of various embodiments in accordance with the principles of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

What is claimed is:

1. A mount assembly for attaching a mechanism which vibrates to a foundation, the mechanism having a bottom surface, said mount assembly comprising:

a mounting bolt, said mounting bolt having means for rigidly attaching to the mechanism which vibrates, said mounting bolt having a shaft and an integral flanged head, said flanged head being substantially larger in diameter than said shift;

a first elastomer member, said first elastomer member having a shape with an inside aperture surface which defines an inside aperture for axial insertion of said mounting bolt shaft therethrough, said first elastomer member having top surface means for contacting the bottom surface of the mechanism which vibrates, said first elastomer member having a bottom surface;

a support bracket, said support bracket having means for rigidly attaching to the foundation, said support bracket having a shape with an inside edge which defines an inside aperture for axial insertion of said mounting bolt shaft therethrough, said inside apertures being larger in diameter than said mounting bolt shaft, said inside aperture being smaller in diameter than the diameter of said mounting bolt flanged head, said support bracket having a top surface which contacts said first elastomer bottom surface, said support bracket having a bottom surface;

a second elastomer member, said second elastomer member having a shape with inside aperture surface which defines an inside aperture for axial insertion of said mounting bolt shaft therethrough, said second elastomer member having a top surface which contacts said support bracket bottom surface, said second elastomer member having a bottom surface which contacts said mounting bolt flanged head; and wherein the top surface of said mounting bolt flanged head has a cross-sectional contour which mates to the cross-sectional contour of said second elastomer bottom surface, said contour substantially restricting horizontal movement of said mounting bolt flanged head relative to said second elastomer bottom surface while substantially transmitting horizontal vibration from said mounting bolt to said second elastomer member bottom surface.

2. The mount assembly of claim 1 wherein said first elastomer bottom surface has a cross-sectional contour which mates to the cross-sectional contour of said support bracket top surface, said contour substantially restricting horizontal movement of said first elastomer bottom surface.

3. The mount assembly of claim 1 wherein said second elastomer top surface has a cross-sectional contour which mates to the cross-sectional contour of said support bracket bottom surface, said contour substantially restricting horizontal movement of said second elastomer top surface.

4. The mount assembly of claim 1 wherein said mounting bolt has shoulder means about said shaft for contacting the bottom surface of the mechanism which vibrates.

5. The mount assembly of claim 1 wherein said first elastomer member has a lower lip on its inside aperture surface which extends over said support bracket inside edge, said lower lip preventing contact of said mounting bolt shaft with said support bracket inside edge upon extreme horizontal movement of said mounting bolt, said lower lip contacting said mounting bolt shaft upon extreme horizontal movement of said mounting bolt.

6. The mount assembly of claim 1 wherein said second elastomer member has an upper lip on its inside aperture surface which extends over said support bracket inside edge, said upper lip preventing contact of said mounting bolt shaft with said support bracket inside edge upon extreme horizontal movement of said mounting bolt, said upper lip contacting said mounting bolt shaft upon extreme horizontal movement of the mounting bolt.

7. The mount assembly of claim 1 wherein said first elastomer member and said second elastomer member have natural frequencies lower than the vibrational frequency of the mechanism which vibrates for absorption of vibrational energy from the mechanism which vibrates.

8. The mount assembly of claim 1 wherein said first elastomer member and said second elastomer member have an annular shape.

9. The mount assembly of claim 1 wherein said mounting bolt head and said second elastomer member are separated by a washer.

10. The mount assembly of claim 1, wherein said inside aperture of said first elastomer member is larger in diameter than said mounting bolt shaft.

11. The mount assembly of claim 10 wherein said inside aperture of said second elastomer member is larger in diameter than said mounting bolt shaft.

12. A mount assembly for attaching a mechanism which vibrates to a foundation, the mechanism having a bottom surface, said mount assembly comprising:

a mounting bolt, said mounting bolt having means for rigidly attaching to the mechanism which vibrates, said mounting bolt having a head portion and an end portion;

a first elastomer member, said first elastomer member having a shape with an inside aperture surface which defines an inside aperture for axial insertion of said mounting bolt therethrough, said inside aperture being large enough that said inside aperture surface normally does not contact said mounting bolt upon vibration, said first elastomer member having top surface means for contacting the bottom surface of the mechanism which vibrates, said first elastomer member having a bottom surface;

a support bracket, said support bracket having means for rigidly attaching to the foundation, said support bracket having a shape with an inside edge which defines an inside aperture for axial insertion of said mounting bolt shaft therethrough, said inside apertures being large enough that said inside edge normally does not contact said mounting bolt upon vibration, said support bracket having a top surface which contacts said first elastomer bottom surface, said support bracket having a bottom surface; and a second elastomer member, said second elastomer member having a shape with inside aperture surface which defines an inside aperture for axial insertion of said mounting bolt therethrough, said inside aperture being large enough that said inside aperture surface normally does not contact said mounting bolt upon vibration, said second elastomer member having a top surface which contacts said support bracket bottom surfaces, said second elastomer member having a bottom surface which contacts said mounting bolt head portion, wherein said first elastomer member, said support bracket and said second elastomer member have cross-sectional contours on their adjacent surfaces which mate together in a locking fashion, a portion of said first elastomer member and a portion of said second elastomer member overlapping in the vertical direction, said support bracket extending between said overlapping portions of said first and second elastomers, one of said overlapping first and second elastomers overlapping said inside edge of said support bracket.

13. A vibrating apparatus comprising:

a mechanism which vibrates, said mechanism having a bottom surface, a foundation;

a mount assembly, said mount assembly comprising:

a mounting bolt, said mounting bolt having means for rigidly attaching to said mechanism which vibrates, said mounting bolt having a shaft and an integral flanged head, said flanged head being substantially larger in diameter than said shaft;

a first elastomer member, said first elastomer member having a shape with an inside aperture surface which defines an inside aperture for axial insertion of said mounting bolt shaft therethrough, said inside aperture being large enough that said inside aperture surface normally does not contact said mounting bolt upon vibration, said first elastomer member having top surface means for contacting the bottom surface of said mechanism which vibrates, said first elastomer member having a bottom surface;

a support bracket, said support bracket having means for rigidly attaching to said foundation, said support bracket having a shape with an inside edge which defines an inside aperture for axial insertion of said mounting bolt shaft therethrough, said inside aperture being larger in diameter than said mounting bolt shaft, said inside apertures being smaller in diameter than the diameter of said mounting bolt flanged head, said support bracket having a top surface which contacts said first elastomer bottom surface, said support bracket having a bottom surface;

a second elastomer member, said second elastomer member having a shape with inside aperture surface which defines an inside aperture for axial insertion of said mounting bolt shaft therethrough, said second elastomer member having a top surface which contacts said support bracket bottom surface, said second elastomer member having a bottom surface which contacts said mounting bolt flanged head; and wherein the top surface of said mounting bolt flanged head has a cross-sectional contour which mates to the cross-sectional contour of said second elastomer bottom surface, said contour substantially restricting horizontal movement of said mounting bolt flanged head relative to said second elastomer bottom surface while substantially transmitting horizontal vibration from said mounting bolt to said second elastomer member bottom surface.

14. A vibrating apparatus comprising:

a mechanism which vibrates, said mechanism having a bottom surface, a foundation;

a mount assembly, said mount assembly comprising:

a mounting bolt, said mounting bolt having means for rigidly attaching to said mechanism which vibrates, said mounting bolt having an end portion and a head portion;

a first elastomer member, said first elastomer member having a shape with an inside aperture surface which defines an inside aperture for axial insertion of said mounting bolt shaft therethrough, said inside aperture being large enough that said inside aperture surface normally does not contact said mounting bolt upon vibration, said first elastomer member having top surface means for contacting the bottom surface of said mechanism which vibrates, said first elastomer member having a bottom surface;

a support bracket, said support bracket having means for rigidly attaching to said foundation, said support bracket having a shape with an inside edge which defines an inside aperture for axial insertion of said mounting bolt therethrough, said inside aperture being large enough that said inside edge normally does not contact said mounting bolt upon vibration, said support bracket having a top surface which contacts said first elastomer bottom surface, said support bracket having a bottom surface; and a second elastomer member, said second elastomer member having a shape with inside aperture surface which defines an inside aperture for axial insertion of said mounting bolt shaft therethrough, said inside aperture being large enough that said inside aperture surface normally does not contact said mounting bolt upon vibration, said second elastomer member having a top surface which contacts said support bracket bottom surface, said second elastomer member having a bottom surface which contacts said mounting bolt head portion, wherein said first elastomer member, said support bracket and said second elastomer member have cross-sectional contours on their adjacent surfaces which mate together in a locking fashion, a portion of said first elastomer member and a portion of said second elastomer member overlapping in the vertical direction, said support bracket extending between said overlapping portions of said first and second elastomers, one of said overlapping first and second elastomers overlapping said inside edge of said support bracket.

* * * * *

UNITED STATES PATENT AND TRADEMARK OFFICE
CERTIFICATE OF CORRECTION

PATENT NO. : 5,096,153

DATED : March 17, 1992

INVENTOR(S) : David F. Seeley et al.

It is certified that error appears in the above-identified patent and that said Letters Patent is hereby corrected as shown below:

On the Title page, under the heading "FOREIGN PATENT DOCUMENTS", add the following cited references:

| | | |
|---|---|---|
| 482,188 | 3/1938 | United Kingdom |
| 571,026 | 8/1945 | United Kingdom |
| 785,459 | 10/1957 | United Kingdom |
| 805,642 | 12/1958 | United Kingdom |
| 58,911 | 2/1982 | EPO |

Column 6, line 42, claim 1; "shift" should read as --shaft--.

Column 6, lines 55 and 56, claim 1; "apertures" should read as --aperture--.

Column 8, line 18, claim 12; delete "shaft" after the word "bolt".

Column 8, lines 18 and 19, claim 12; "apértures" should read as --aperture--.

UNITED STATES PATENT AND TRADEMARK OFFICE
CERTIFICATE OF CORRECTION

PATENT NO. : 5,096,153
DATED : March 17, 1992
INVENTOR(S) : David F. Seeley et al.

It is certified that error appears in the above-identified patent and that said Letters Patent is hereby corrected as shown below:

```
Column 8, line 32, claim 12; "surfaces" should read as
    --surface--.

Column 9, line 6, claim 13; "apertures" should read as
    --aperture--.
```

Signed and Sealed this

Twentieth Day of July, 1993

Attest:

MICHAEL K. KIRK

Attesting Officer

Acting Commissioner of Patents and Trademarks